(12) United States Patent
Ryan et al.

(10) Patent No.: US 11,012,340 B2
(45) Date of Patent: *May 18, 2021

(54) METHOD AND SYSTEM FOR DETECTING INTERFERENCE TO WIRELESS NETWORKS

(71) Applicant: Spectrum Effect Inc., Kirkland, WA (US)

(72) Inventors: David James Ryan, Jackson, WY (US); Charles James Judson, Seattle, WA (US)

(73) Assignee: Spectrum Effect Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,379

(22) Filed: Jul. 17, 2019

(65) Prior Publication Data

US 2019/0342202 A1 Nov. 7, 2019

Related U.S. Application Data

(63) Continuation of application No. 15/434,001, filed on Feb. 15, 2017.

(60) Provisional application No. 62/383,812, filed on Sep. 6, 2016.

(51) Int. Cl.
| | | |
|---|---|---|
| H04L 12/28 | (2006.01) | |
| H04L 12/26 | (2006.01) | |
| H04L 12/24 | (2006.01) | |
| H04W 24/10 | (2009.01) | |
| H04W 24/08 | (2009.01) | |
| H04W 88/02 | (2009.01) | |

(52) U.S. Cl.
CPC ............ *H04L 43/16* (2013.01); *H04L 41/142* (2013.01); *H04L 43/065* (2013.01); *H04W 24/10* (2013.01); *H04W 24/08* (2013.01); *H04W 88/02* (2013.01)

(58) Field of Classification Search
CPC ..................................................... H04L 12/50
USPC ....................................................... 370/329
See application file for complete search history.

(56) References Cited

U.S. PATENT DOCUMENTS

| | | | |
|---|---|---|---|
| 8,059,542 B1 * | 11/2011 | Oroskar | ............... H04L 1/0021 370/235 |
| 2010/0248736 A1 | 9/2010 | Hulkkonen et al. | |
| 2012/0147828 A1 | 6/2012 | Wigren | |
| 2014/0112164 A1 | 4/2014 | Wigren | |
| 2014/0162682 A1 | 6/2014 | Tafreshi et al. | |
| 2014/0321361 A1 | 10/2014 | Wigren et al. | |
| 2017/0064564 A1 | 3/2017 | Yun et al. | |

OTHER PUBLICATIONS

Search Report and Written Opinion dated Mar. 5, 2018 for PCT Application PCT/US2017/063303.

* cited by examiner

*Primary Examiner* — Dang T Ton

(57) ABSTRACT

Interference is a common problem in wireless communication networks. This disclosure provides a method and system that detect and locate interference sources based on various data describing or captured from an operational network during normal mobile wireless service times.

20 Claims, 7 Drawing Sheets

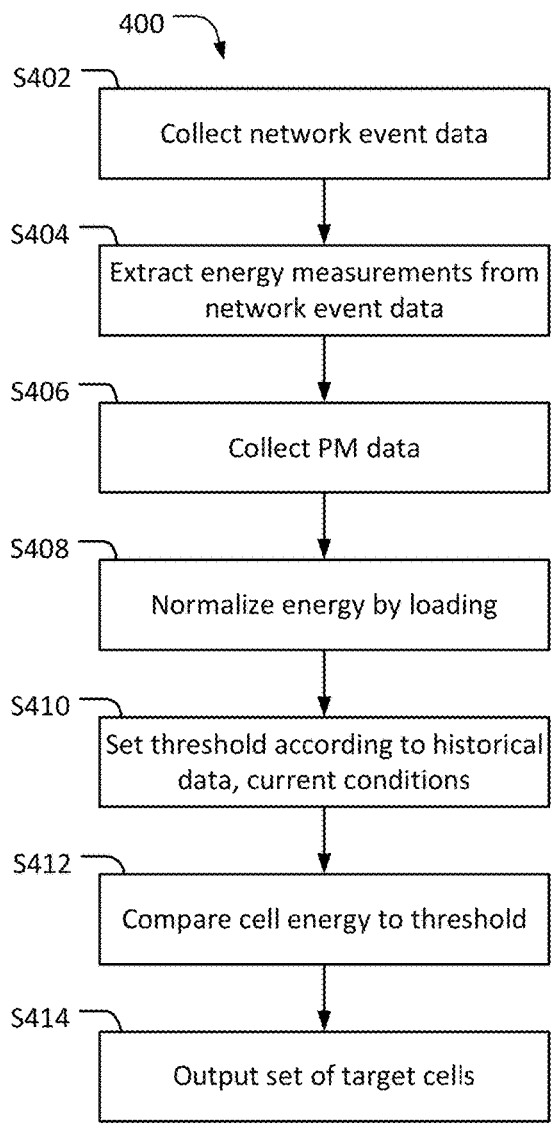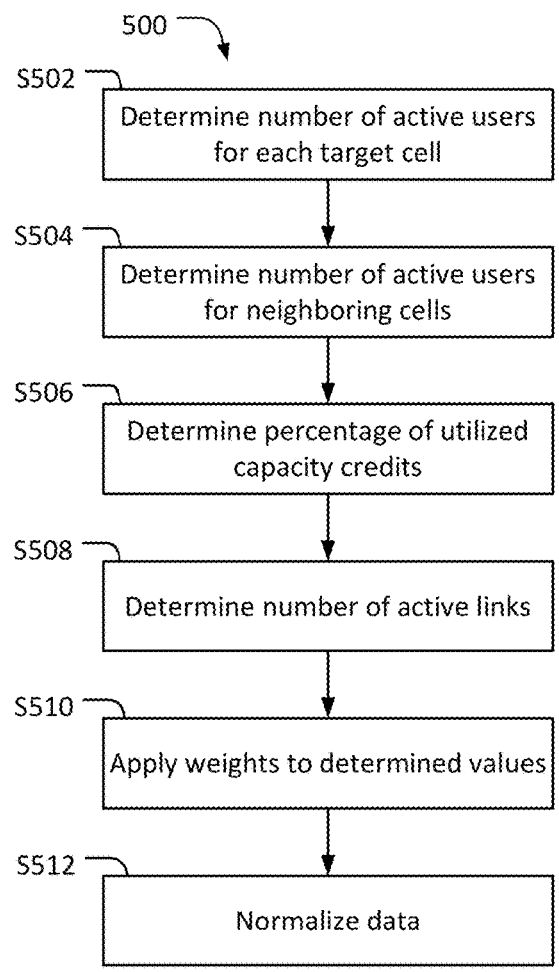
FIG. 4
FIG. 5

METHOD AND SYSTEM FOR DETECTING INTERFERENCE TO WIRELESS NETWORKS

CROSS-REFERENCES TO RELATED APPLICATIONS

This application is a continuation of U.S. patent application Ser. No. 15/434,001, filed Feb. 15, 2017, which claims priority to U.S. Provisional Application No. 62/383,812, filed on Sep. 6, 2016, which is incorporated by reference herein.

BACKGROUND

Modern wireless communications operate in interference limited environments where signal quality to and from network subscriber devices is limited in part by interference from other users served by the same or nearby cells. The design and optimization of these networks are based on having clear spectrum occupied only by radio frequency transmitting equipment associated with the specific network. However, this ideal of clear spectrum occupied only by intended users of the system is not always achieved.

Real world systems often experience unexpected network interference which may originate from intentional and or unintentional radio frequency (RF) generating sources. These potential interference sources include many things such as industrial machinery, electronics test equipment radiating signals in the bands of interest, undesired mixing products generated by the licensed system itself and illegal radio sources operating in the wrong frequency bands. The result of these system interference sources is degraded system service and reduced wireless network capacity coverage as the intentional system signals suffer capacity and quality losses due to these interferers.

Conventional approaches for detecting and subsequently locating these network interferers typically involve intentionally disabling transmitting equipment across large areas of the network coverage area and searching for interference sources using sensitive receiving equipment and directional antennas. These methods are very costly as they involve turning off the revenue-generating network equipment and deploying teams in the field, typically during maintenance windows, which are low network utilization times such as the middle of the night. If network interferers are only present outside of these search times, then they will not be detected or located as part of these searches.

Another approach to interference detection involves deployment & utilization of dedicated energy measurement probes throughout the serving areas. Energy detection probes in this context are radio receiving devices that quantify energy levels detected within defined radio frequency bands, as opposed to data level probes that detect information in RF transmissions. However, there are substantial costs associated with installing, maintaining and monitoring probes, and a large number of probes would be required to effectively cover network areas.

TECHNICAL FIELD

Embodiments of the present disclosure relate to managed wireless networking equipment, including management and optimization of commercial wireless networks, and to wireless network equipment utilizing dynamic spectrum sharing technologies.

BRIEF SUMMARY

This disclosure provides embodiments of a system and methods that detect and locate interference sources based on various data describing or captured from an operational network during normal mobile wireless service times. The techniques described below can be used by network operations teams to rapidly and accurately identify the presence of harmful interference without interrupting network operations.

In addition to the application to interference identification, characterization and elimination, embodiments of this disclosure are applicable to the emerging field of spectrum sharing. In shared spectrum systems, multiple network operators, each maintaining their network, communications and sensing devices cooperatively, share specific blocks of radio frequency spectrum. In such a system it is beneficial to rapidly detect interference conflicts between various operators such that spectrum sharing policies can be updated in real-time to resolve such conflicts. Embodiments of this disclosure support spectrum sharing by providing network operations teams with analytical tools such that they can observe interference from other users transmitting in the associated spectrum bands.

Embodiments of this disclosure aggregate and correlate information from available but disparate sources for the purpose of detecting unintentional local or external interference to a wireless network. An embodiment may gather network performance data, network topology data, network configuration data, and network event data. From these conventionally isolated information sources, embodiments may normalize measured noise rise, and cross correlate the raw or normalized noise rise data to determine instances of localized cell site interference or regional external system interference. From this data, additional steps may be performed to localize the origins of external system interference.

An embodiment of a process for identifying unintentional interference in a cellular network includes determining noise rise values for a plurality of cells in the cellular network, normalizing the noise rise values according to cell load, correlating the normalized noise rise value of a target cell with normalized noise rise values of other cells of the plurality of cells, and determining that the unintentional interference is present in the cellular network.

Correlating the normalized noise rise value of the target cell may include correlating the normalized noise rise value of the target cell with normalized noise rise values of one or more cell that is co-sited with the target cell. Correlating the normalized noise rise value of the target cell may further include correlating the normalized noise rise value of the target cell with normalized noise rise values of neighbor cells served by different base stations from the target cell.

The process may include, when the normalized noise rise value of the target cell correlates with the normalized noise rise value of the one or more cell that is co-sited with the target cell, and the normalized noise rise value of the target cell does not correlate with the normalized noise rise values of the neighbor cells, determining that unintentional interference is local to a base station of the target cell. When the normalized noise rise value of the target cell does correlate with the normalized noise rise value of the one or more cell that is co-sited with the target cell, and the normalized noise rise value of the target cell correlates with the normalized noise rise values of the neighbor cells, the process may include determining that unintentional interference is external to a base station of the target cell. The process may further include determining a location of the unintentional interference using locations of the neighbor cells that correlate with the normalized noise rise of the target cell.

Determining noise rise values may include analyzing call event data, and the call event data may include power measurement data from user equipment (UE) being served by the plurality of cells. Correlating the normalized rise value of the target cell may include correlating the normalized rise value of the target cell with normalized noise rise values of the other cells in time, and the time correlation may be determined at a resolution of one minute or less.

BRIEF DESCRIPTION OF THE DRAWINGS

FIG. 4 illustrates an embodiment of a process for detecting high noise rise cells.

FIG. 5 illustrates an embodiment of a process for normalizing noise rise data.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
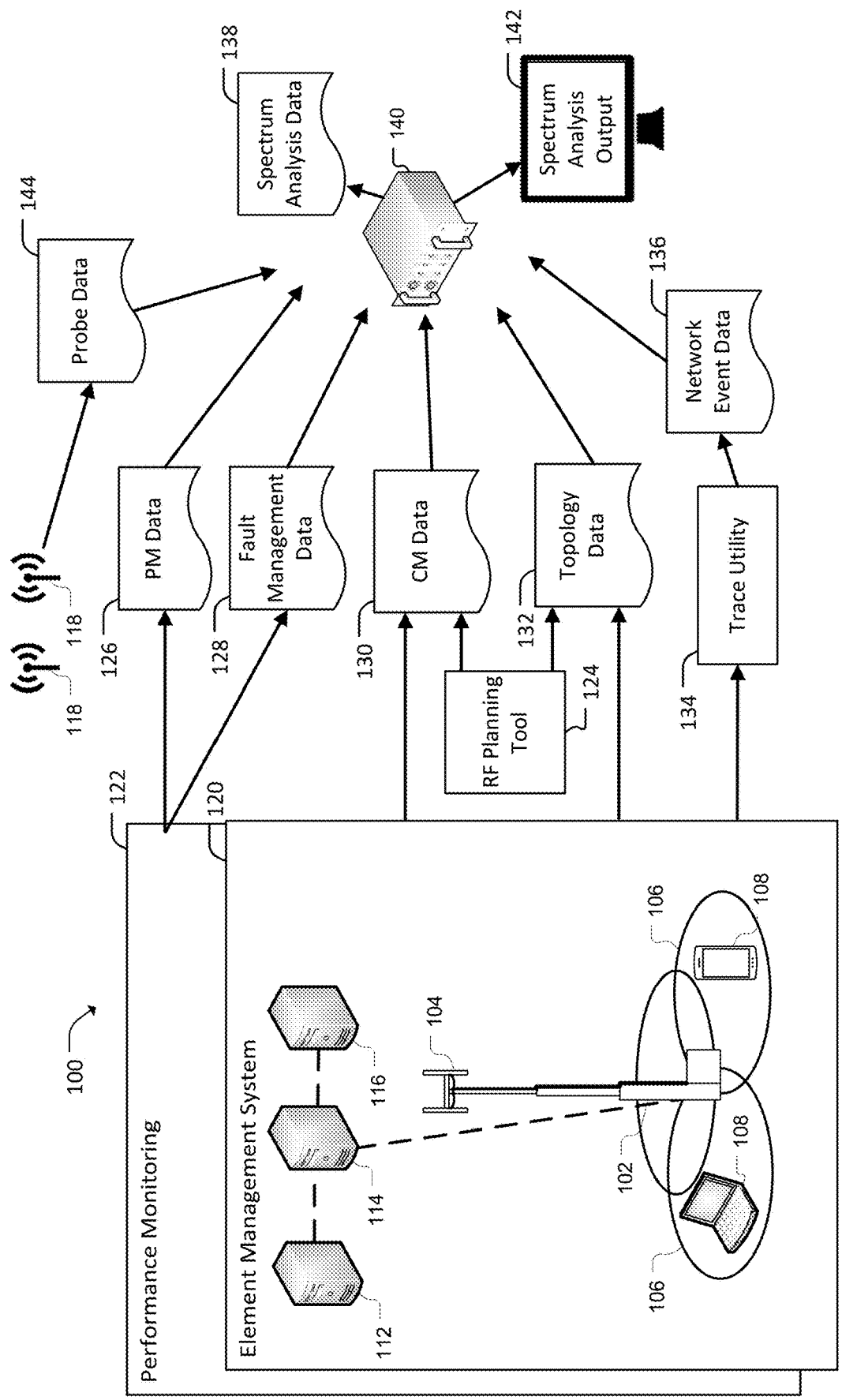
FIG. 1 illustrates elements of a system and process for identifying unintentional interference in a cellular communications network according to an embodiment.

FIG. 1 illustrates a networked spectrum analysis system 100 according to an embodiment. The system 100 integrates information from available wireless network sources to detect, isolate, characterize and locate undesired radio frequency interference in the context of a wireless network. Sources of this information, which are hardware elements of a wireless network, are available in typical wireless cellular networks, but they are not conventionally connected and configured in the manner suggested by this disclosure. In particular, the spectrum analytics server 140 is a novel component of a telecommunications network.

A radio access portion of system 100 may include one or more base stations 102, each of which are equipped with one or more antennas 104. Each of the antennas 104 provides wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base station 102 may be outfitted with an omnidirectional antenna that provides service to a single cell for a given RAT.

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that are provided with wireless communications services by a base station 102.

The system 100 may include a backhaul portion 110 that can facilitate distributed network communications between core elements 112, 114 and 116 and one or more base station 102 within a cellular network. In an embodiment, the backhaul portion of the network includes intermediate links between a backbone of the network which is generally wire line, and sub-networks or base stations 102 located at the periphery of the network. The network connection between any of the base stations 102 and the rest of the world may initiate with a link to the backhaul portion of a provider's communications network. A backhaul 110 may include an X2 connection through which base stations 102 communicate with one another directly.

The core network devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. Persons of skill in the art will recognize that core network devices 112, 114 and 116 are different depending on the particular RAT or set of RATs that are present in the network. The core network devices support a radio access portion of the network that includes the base stations 102.

Elements of the communications network 100 are part of an Element Management System (EMS) 120 and a Performance Monitoring (PM) system 122. The PM system 122 may include base stations 106 as well as core network equipment that collect and process performance data and performance metrics for the network. A spectrum analysis server 140 interfaces with various network components, including components of the PM system 122 and the EMS 120.

Although FIG. 1 shows the spectrum analysis server as a single, discrete component, embodiments are not so limited. For example, in other embodiments, components of the spectrum analysis server 140 may be distributed among multiple computing entities. In addition, hardware for the spectrum analysis server may perform processes not directly related to interference.

The performance monitoring system 122 generates performance data 126 for the wireless network. The PM data 126 may be derived from observations of network performance, which may be reported at a predetermined time interval, e.g., every minute, 5 minutes, 15 minutes, hourly or daily. PM data 126 may include raw event counts (e.g. counts of dropped calls or handover failures during the observation period) or complex derived performance indicators (e.g. noise rise normalized by user loading, Channel Quality Indicator (CQI) distribution statistics normalized by data volume, etc.).

In some embodiments, PM data 126 includes data input from a dedicated PM tool, as well as data received directly from EMS 120, or elements of the Operations and Support System (OSS). In an embodiment, PM data 126 may be derived directly from network event data by the spectrum analytics server 140. For example, in an embodiment, when event data 136 is available to the spectrum analytics server 140, the server may aggregate individual events to create equivalent PM counters and KPIs. Thus, in some embodiments, PM data 126 is derived from sources other than a PM system 122.

Fault Management Data 128 may be transmitted from the PM system 122 to spectrum analysis server 140. Fault Management Data 128 includes, for example, alarm data that indicates performance issues at one or more cell site.

Configuration Management (CM) data 130 is input to the spectrum analysis server 140 from EMS 120. CM data 130 includes the current configuration of various wireless network equipment, such as the configuration of base stations 102 and core components such as Radio Network Controllers.

CM Data 130 is quasi-static and typically only updated as a result of network optimization such as cell splitting, cell ID reassignment, changes in operating frequency or transmit power, etc. CM data 130 may include pertinent information such as cell technology (e.g., 2G GSM, 3G UMTS, 4G LTE, 5G) associated with physical and logical network elements, operating frequency, transmit power, reuse codes, type of cell (e.g. macro, micro, pico cell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g. indoor, outdoor, distributed antenna system, etc.), etc. In addition to interference detection and characterization, topology data 132 may be used to aid in correlating PM data 126 and network event data 136 against actual physical locations, and for understanding physical distance relationships between network elements.

RF planning tool 124 has network planning information used to determine cell site positions and pertinent parameters such as sector pointing angles. Network parameters established via automated or manual network planning processes may be used to configure the actual network equipment and serve as source information for some of the CM data 130 and Topology data 132. Alternative embodiments may include a direct data connection between entities that perform RF planning functions and the spectrum analysis server 140, provided that the network CM data 130 and topology data 132 is available to support processes described in this disclosure.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is reported at intervals of a few seconds, it can be used to determine variance of conditions over time at relatively short intervals, such as five minutes, one minute, 30 seconds, or as low as the reporting interval, which may be two seconds.

Network event data 136 includes call event data, or call trace data according to LTE terminology. Call trace data is typically reported at two second intervals in LTE networks, so the amount of raw event data generated by a network can be relatively large. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, RSSI measurements, and protocol messages. Network event data 136 is not conventionally used for interference detection, characterization or localization.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used as part of the interference detection processes described by this disclosure.

The collection point for network event data 136 varies between specific wireless technologies, and may vary in vendor-specific implementations. For instance, network event data 136 is typically collected at the RNC (Radio Network Controller) entity in 3GPP defined 3G networks (i.e., UMTS, HSPA), but network event data 136 is collected by the eNodeB entity in 4G LTE systems. Network event recordings may be pulled directly from the network elements that store the events by the spectrum analysis server 140, or automatically stored on a separate data storage server, or staging server, such that external systems such as the spectrum analytics server 140 may access network event data 136 without incurring additional data loading on the network elements. Accordingly, it should be understood that network event data 136 may be collected, stored and retrieved in various ways in different embodiments.

The network event data 136 may be collected by a trace utility 134 that is integrated with a cellular network. Trace concepts and requirements are explained, for example, in the Third Generation Partnership Project (3GPP) Technical Specification TS 32.421.

An embodiment may use network event data 136 without using any PM data 126. In such an embodiment, spectrum analysis does not use input from a dedicated Performance Monitoring system 122, but derives base station performance indicators directly from network event data 136. In such an embodiment, network event data records may be aggregated to determine sub-performing cells and determine high noise rise cells.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance the accuracy of both the interference detection and interference localization aspects of this disclosure.

Also shown in FIG. 1 is a plurality of energy sensing probes 118, which may be dedicated to the task of sensing energy in particular frequencies and reporting energy detection results. Energy sensing probes 118 may be installed at various locations in a network, and may be tuned to detect energy on one or more frequencies that are used for wireless communications. Although embodiments of this disclosure do not require the deployment of dedicated energy sensing probes 118, their use is not precluded.

In an embodiment that uses dedicated energy detection probes 118, energy measurements derived directly from the detection probes are used in conjunction with or in place of energy measurements derived from network event data 136 as inputs to the spectrum analytics server 140. Subsequently, the measurements from dedicated energy detection probes 118 may be correlated with known probe positions and probe configuration characteristics (e.g. directional antennas) as well as current network loading data to enhance the detection of undesired radio frequency interference within the network.

Probe data may in some cases be broadband and cover wider spectrum segments than the operational wireless network, and as such may be used to monitor bands adjacent or even highly separated from current wireless bands. Such broadband spectrum analytics sensing may be used to support frequency agile spectrum sharing solutions whereby internal band metrics (e.g. network event data correlated with topology and CM data), as well as probe supported broad band metrics to enhance performance of spectrum analytics.

The spectrum analysis server 140 represents a specific processing device that interfaces to one or more of the external data sources described above. The spectrum analysis server 140 may perform one or more interference detection, characterization and localization processes described in this disclosure. In an embodiment, the spectrum analysis server 140 is physically located in an operator's Network Operations Center (NOC). From a logical perspective, the spectrum analysis server 140 is located in the Operations Support System (OSS) plane. The spectrum analysis server 140 may perform one or more of the specific processing steps described below.

Figure 2:
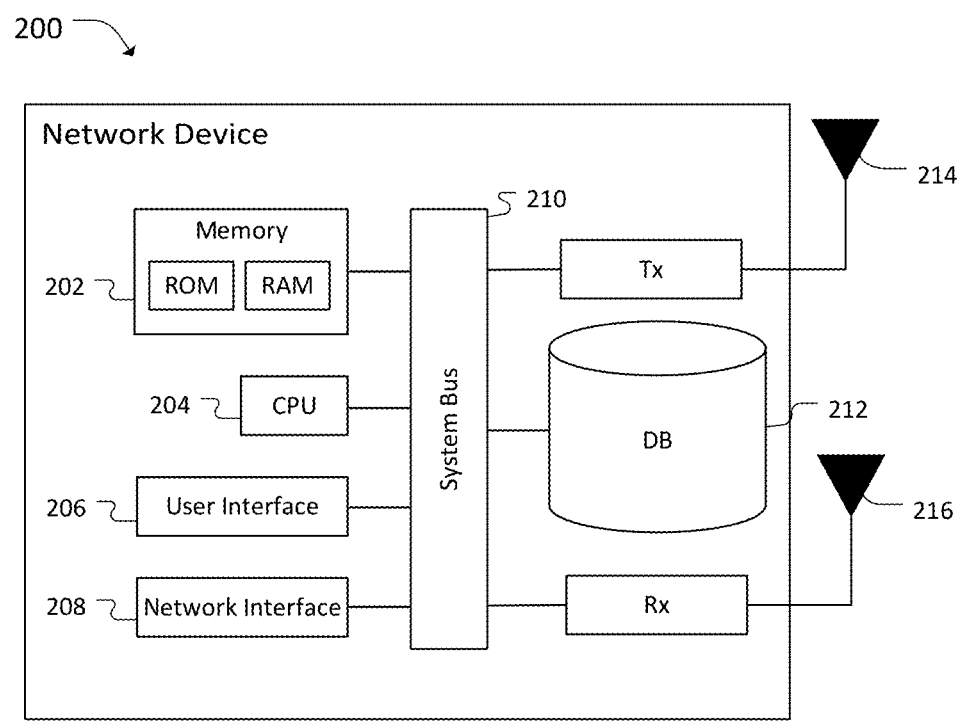
FIG. 2 illustrates a network device according to an embodiment.

FIG. 2 illustrates a block diagram of a network device 200 that may represent UE 108, network controller devices 110, 112 and 114, a spectrum analysis server 140, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-volatile computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device 200 has wireless connectivity, it may have a transmitter 214 and a receiver 216, each of which may include one or more antennas that operate on one or more frequencies.

Figure 3:
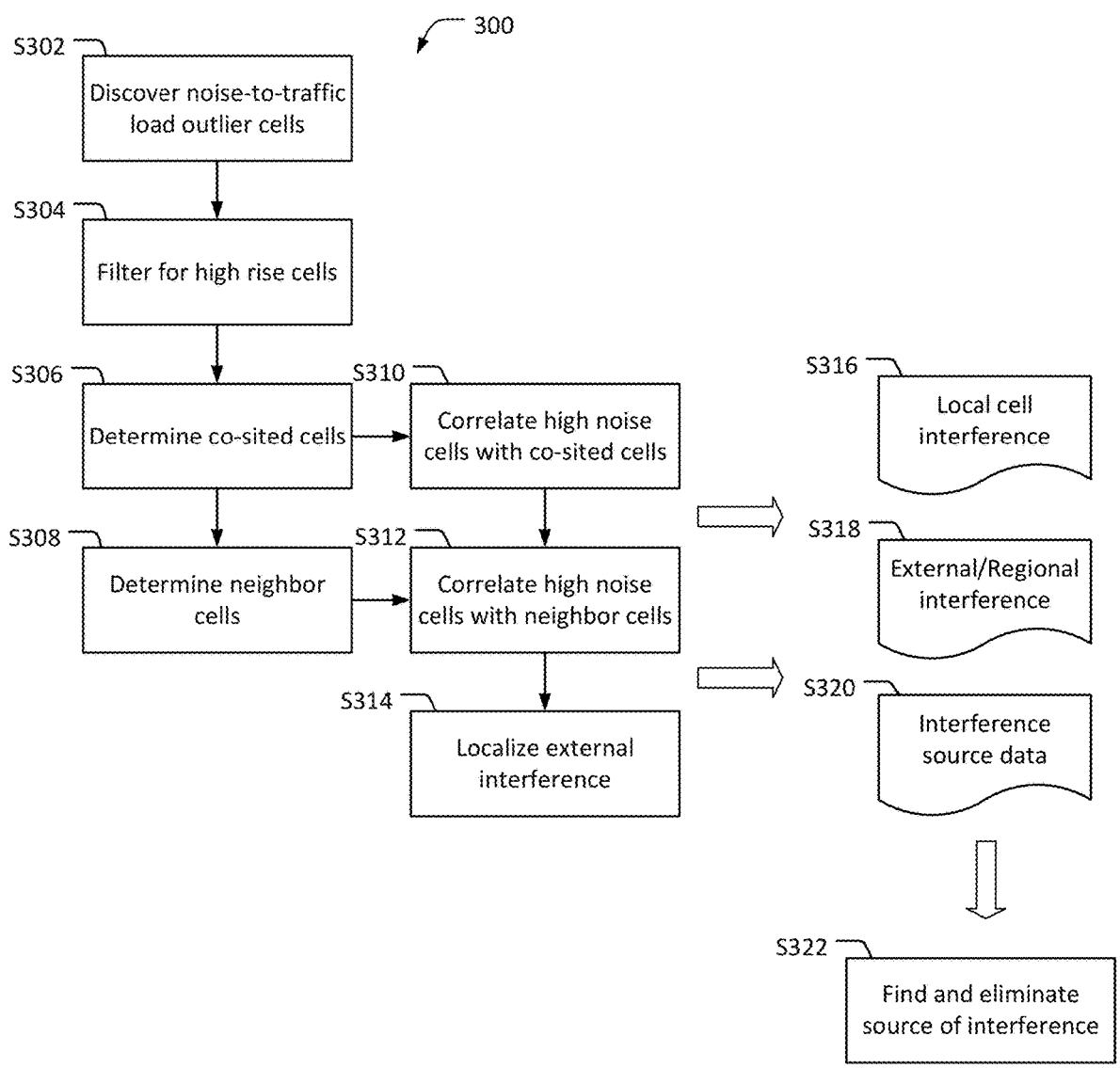
FIG. 3 illustrates an embodiment of a process for identifying unintentional interference in a cellular communications network according to an embodiment.

FIG. 3 illustrates elements of an embodiment of a process 300 for identifying interference in a cellular network. The process flow provided in FIG. 3 is a high level process flow that illustrates basic elements of embodiments of this disclosure. The following explanation of process 300 is not exhaustive in describing every possible embodiment or process step that may be employed when implementing an embodiment. Specific details for some of the elements of process 300 are provided in later portions of this disclosure.

High noise-to-traffic load outlier cells are discovered at S302. The detection may be based on static predetermined thresholds, or may be based on dynamic time and location variable thresholds or group statistics. In any of these cases, performance data from multiple network cells may be evaluated to determine if any of the cells are experiencing excessive noise rise relative to expectations. In some embodiments, the noise rise thresholds are statically or dynamically set based on normalization against uplink or downlink data traffic loading or other statistical methods such as correlation with current traffic loading, graphical scatter plot methods as described below, etc.

The list of potential high noise rise cells discovered at S302 are further filtered by additional criteria such as total cell loading, loading of nearby cells, etc. at S304. This filtering increases the probability that the outlier cells discovered at S302 are experiencing higher than expected noise levels given their current operating load. The output of this step is a list of high noise rise cells which serve as target cells for further processing as described below.

A list of co-sited cells is generated at S306 for each high noise rise cell detected at S302. Co-sited cells are additional network cells operating at the same cell site as defined by latitude and longitude or similar absolute positioning information. In one embodiment, cells sharing the same physical location and the same operating frequency are considered co-site cells. In other embodiments, all co-located cells, regardless of technology (e.g. 3G, 4G) or specific operating frequency may be considered co-site cells for the purposes or S306. Determining co-sited cells supports correlation against, and detection of, localized interference sources at the cell site, including potential broadband interference resulting from faulty cell site equipment, and interference from transmit inter-modulation products.

The data used to identify co-sited cells may be derived, for example, from known network Topology and configuration management (CM) data. The CM data may be geographical coordinates such as cell latitude and longitude. An embodiment may determine additional data for the co-sited cells, including cell technology (e.g. GSM, UMTS, LTE) and cell operating frequency. These and other cell characteristics may be retrieved from CM data, or alternatively, this information may be provided by integrated external tools such as SON systems that are configured to supply cell relationship information including a list of co-site cells for each high noise rise cell.

In addition to detecting high noise rise cells, an embodiment of this disclosure may detect external interference originating near detected high noise rise cells. Interference can be characterized, and a source can be localized, by establishing the extent to which interference affects cells that are near to a high noise rise cells. For example, neighbor cells may be used to establish a frequency range and area that is affected by interference. To achieve these and other advantages, neighbor cells of each target cell are identified at S308.

Neighbor cells of a target cell may be determined at S308 by identifying cells that are located within a predetermined distance from the target cell. The neighbor cells may be cells that use the same technology or frequency as the target cell, as well as, or instead of, cells that use different technologies or frequencies.

In an embodiment, neighbor cells may be identified using information from Network Topology and CM data, which may be utilized along with distance or other relational parameters to determine nearby cells that may be classified as neighbor cells. For instance, when utilizing latitude and longitude information, all cells within a defined linear distance may be classified as neighbors. In various embodiments, the cells that are identified as neighbors may be restricted to cells sharing the same technology and operating frequency, or extended to include all nearby operational cells of different technologies or operating frequencies.

Neighbor cell information may be determined by an external tool such as a SON system, and that information may be transmitted to a spectrum analysis server 140. For example, a SON tool may automatically establish a number of tiers of separation from a target cell. In such an embodiment, the spectrum analysis server 140 may request a list of, for example, first and second tier neighbors for a target cell. In such an embodiment, determining neighbor cells may include transmitting a request for first and second tier neighbors from a SON tool, and receiving a list of cells in response to the request. In addition, the neighbor list determined for each high noise rise cell at S308 may include the co-site neighbors as described above.

The noise rise and normalized noise rise data for each high noise rise cell are correlated with similar data from each co-sited cell at S310. Correlating high noise rise cells with co-sited cells may include performing a correlation of raw or normalized noise rise for each cell in the high noise rise cells list against similar raw or normalized noise rise data for each co-site cell. The noise rise data being correlated may be drawn from network event data 136 that provides data at high sampling rates (e.g. every 2 seconds). The correlation may allow for small time variations in network event data arriving from multiple cells, and data averaging techniques may be performed prior to noise rise correlation.

Co-site correlation at S310 may identify noise rise events that are detected at both the previously detected high noise rise cell and one or more of its co-sited cells. The output of this processing step may be a list of correlated high noise rise sites.

In some cases, some or all of the co-site cells will also see noise rise events above the defined high noise rise threshold and appear on the high noise rise cells list, but it is similarly probable that other co-site cells either do not see elevated noise, or do see elevated noise but at levels less than the detection threshold.

In cases where noise rise at a target cell is highly correlated with noise detected at co-sited cells, the cell in question may be identified as a candidate local noise rise cell at S316. A target cell may be identified as a candidate local noise rise cell even if the absolute level of noise at the co-site cells is below the detection threshold that triggered identifying the target cell as potentially being affected by interference at S302 or S304.

Here, local interference is interference that is local to the cell site of the base station serving the affected cell that does not substantially affect neighbor cells of other sites. Accordingly, interference with high correlation with co-sited cells and low correlation to neighboring cells may be categorized as local interference. Local interference, as well as external interference that is from a source external to a cell site, are distinct from normal wireless interference that is caused by intended, conventional wireless signals such as scheduled transmissions and reference signals. Local and external interference may therefore be referred to as unintentional or non-cellular interference to distinguish from the interference caused by intended cell signals.

Co-site correlation at S310 supports identifying sites with higher than expected noise rise seen by two or more co-site cells. As discussed above, the co-site cells identified at S306 may be restricted to cells sharing the same technology and same operating frequency. In another embodiment, co-site cells identified at S306 may also include other cell types or cells configured to operate on different frequencies, which supports detection of wideband local noise sources such as malfunctioning site electronics, grounding issues, etc.

High noise rise cells are correlated with neighbor cells at S312. Correlating high noise rise cells with neighbor cells at S312 may be carried out in a similar manner to the correlation of noise between co-sited cells at S310.

In an embodiment, a mathematical correlation is performed between a given high noise rise cell and each of its neighbor cells as determined at S308 against time stamped network event data 136. A correlation threshold may be established, and all cells exceeding this threshold at the same or similar time are identified as correlated noise rise neighbor cells. In addition, the time element of correlation may have a tolerance to account for network event measurement and time stamp errors. Persons of skill in the art will recognize that the specific correlation value and time tolerance for a given embodiment may be tailored to achieve higher or lower detection rates. Examples of correlation thresholds include 0.50, 0.65, 0.80 and 0.90.

Embodiments detect interference via network event data 136, which is high sampling frequency data with energy level reporting on the order of seconds. The techniques described in this disclosure may also be applied to less frequent data sources such as network PM data including KPIs (Key Performance Indicators), which may be reported at longer intervals such as a single energy level KPI report every 15 minutes or one report per hour. Embodiments of this disclosure are not restricted to high sampling rate reported data.

If neighboring cells do not experience a highly time-correlated noise rise with respect to a target cell, the target cell may be reported as a local noise rise cell at S316. On the other hand, if the noise rise is highly correlated and temporally aligned with near neighbor cell noise rise, the noise rise is reported as being affected by an external or regional noise source at S318. The detection of interference events that are highly correlated in time and between a target high noise rise cell and one or more neighboring cells implies the existence of external noise sources within a given region.

A number of interference characteristics can be determined from embodiments of this disclosure as well, such as magnitude and frequency. Magnitude can be estimated by the number and extent to which neighbor cells are affected, while frequency characteristics can be determined by analyzing which frequencies are affected. This information may then be correlated with a list of known, pre-characterized interference sources to aid network operators in the detection of the interference source, which may be included in the interference source data output at S320. This data, which may include raw data, reports, etc., may be used by network operator personnel to identify and eliminate sources of interference that are negatively affecting network performance.

Additional signal processing may be employed to increase the probability of detecting local noise rise cells. For example, uplink noise rise at co-site cells may be normalized against cell downlink traffic to investigate possible cases of intermodulation or other noise resulting from local transmission equipment.

For each external/regional noise source detected, localization may be performed at S322. The localization process may include triangulation or trilateration based on location, as well as antenna pointing angles and the detected noise amplitudes of each affected cell. The results of this localization are subsequently reported, and may be graphically mapped, at S320.

Local and regional interference data may be used by an operator controlling the network at S322. For example, the operator may deploy personnel to the local interference sites based on information reported at S316 or S320 to resolve the interference. In some embodiments, the interference in the report is characterized sufficiently to identify a particular category or source of interference, such as an oxidized terminal that causes Passive Inter-Modulation (PIM) interference. With this information, the personnel can rapidly and efficiently resolve an interference problem with minimal disruption to the network area.

PIM interference can be caused by oxidation of metal base station components, so base station sites are more susceptible to PIM interference as they age. While operators typically check base station components for oxidation when they are installed, base stations are rarely checked after they are installed. Accordingly, PIM interference is a common problem in networks.

PIM can be characterized by mixing the frequencies of multiple RF signals, which may include summing or subtracting frequencies. The resultant product frequency is typically outside of the range of licensed cellular spectrum. However, third order intermodulation products of PIM are closer in frequency to the original signals, so third order PIM products frequently degrade network performance.

Embodiments of the present disclosure are well suited to detecting PIM products. When a high noise cell is highly correlated with noise rise at co-sited cells but not with neighbor cells, an interference source that is local to the base station of the target cell is likely. Because PIM products are a known phenomenon, they occur at predictable energy levels and frequencies. These energy levels and frequencies can be used to refine automatic analysis performed by spectrum analysis server 140 to identify PIM as a cause of interference at a target base station with a high level of probability.

When one or more target cell is classified as being affected by regional interference, personnel can use the localization information from S320, such as a localization map or geographic coordinates, to identify a specific area as having the highest probability of being the location of the source of interference. Process 300 may further characterize the interference with, for example, time and frequency information, that can help a network operator rapidly and efficiently identify its source. For example, time, amplitude and frequency characteristics can be used to determine that interference is from a predetermined source, such as a sparking electrical coupling or a radar installation.

An initial step in process 300 is to determine which if any network cells have detected unexpectedly high noise rise during an observation period. An embodiment of this process is illustrated in FIG. 4, which shows an embodiment of a process 400 for detecting high noise rise cells.

Network event data 136 may be collected by a spectrum analytics server at S402. The network event data 136 are data events related to uplink energy, to determine uplink energy above a defined threshold. In more detail, network elements (e.g., RNCs, eNodeBs) may generate events containing uplink energy measurements at a periodic interval, such as every one or two seconds. These energy measurement events may be extracted from the network event data 136 at S404. The energy measurements may be referred to, for example, as noise rise, received wideband power, or uplink Received Signal Strength Information (RSSI). The measurements of uplink energy may be in units that map to dBm of power on a range of approximately −120 dBm to −58 dBm.

The energy measurements in network event data 136 may represent all radio frequency energy detected on the uplink frequencies at a given wireless cell, including intentional energy generated by in-cell or neighbor cell users utilizing the wireless network. The specific measurement values may vary depending on user loading and specific user-to-base-station propagation channels, which depend on specific user positions and the local propagation environment. While a specific level of uplink energy, such as noise rise, will vary over time, the overall range and upper limit of expected noise rise in a properly functioning wireless network are bounded.

In some embodiments, performance measurement (PM) data 126 may be collected from a PM system or a SON system, which are typically pre-existing in networks, at S406. In some embodiments, when PM data 126 is collected at S406, the PM data can be used to identify a set of target cells based on performance metrics that indicate that the target cells are under-performing. In some embodiments, evaluating cell characteristics using PM data 126 can be implemented in place of determining high noise rise cells using network event data 136, while in other embodiments, both PM data and network event data are used together, or network data is used without PM data. In some embodiments, PM data 126 is analyzed to identify under-performing cells, and network event data is only collected and analyzed for the under-performing cells.

When PM data is collected in process 400, it may be used to determine that one or more network cells is failing to meet performance criteria. The particular performance metrics collected at S406 may be metrics that indicate a high probability that they are experiencing high levels of noise energy, such as metrics related to errors and throughput. Although names vary between vendors and technologies, examples of specific PM counters and aggregate KPIs include UL_Noise_Rise, Received Total Wideband Power (RTWP), RSSI measured on downlink by UEs or measured on the uplink at the serving base station, Received Signal Code Power (RSCP) and Reference Signal Received Power (RSRP), which describe energy levels present in a channel, as well as PM data related to a number of attached users, a number of active voice users, a number of active data session users, and capacity credits consumed vs capacity credits available. In general, the PMs and KPIs collected here relate to wireless channels noise.

In some embodiments, regardless of the source of cell energy data, the cell energy data is normalized at S408 by user loading levels. The user loading levels may be loading levels for the associated cell, and may account for loading levels of nearby cells and other local conditions as well. More specific details of normalization schemes are discussed in more detail at other locations in this disclosure.

One or more threshold value for detecting cells affected by interference may be determined at S410. Detection thresholds may be statically configured or dynamically determined based on historical network performance. More sophisticated dynamic thresholds may be utilized based on a short and long-term evaluation of noise rise behavior at specific cell sites or across cellular market regions. Similarly, high noise rise detection may be based on noise rise normalized by user loading with the understanding that more active users typically results in higher acceptable noise rise limits.

The cell energy data is compared to the threshold value at S412. A basic high noise rise detection implementation involves establishing an upper limit to acceptable noise rise, such as −85 dBm, and classifying all cells that report noise rise above this threshold as high noise rise cells over the observation period.

A set of target cells is output at S414. The set may be output as a list containing zero to a plurality of cell identifiers, each representing a cell at which higher than expected noise was detected. The output of this step may also include information of the times when high noise was detected at each cell if such information is available. Optional information output from this stage may include first and second order statistics such as mean noise rise, noise rise variance over an observation window, etc. Such information may be useful to identify a specific source of interference.

FIG. 5 illustrates a number of steps that may be performed in a process 500 of normalizing noise rise data. In an embodiment, noise rise normalization may be carried out concurrently with elements of process 400, e.g. at S408, before outputting a set of target cells.

One purpose of noise rise normalization is to account for the expected allocation of overall noise rise related to the number of active users and the amount of wireless data being transferred by the network. The noise rise measurements being normalized may be extracted from network event data 136, to provide high rate sampling of noise behavior at cells of interest.

In various embodiments, elements of process 500 may be combined in different ways to normalize noise rise data. For example, an embodiment may simply normalize noise rise data by the number of active users determined at S502, while another embodiment may normalize by the number of active users determined at S502 in addition to a number of active users for neighboring cells determined at S504, both of which may be weighted at S510.

A number of active users for a cell of interest is determined at S502. The number of active users can be determined from, for example, network event data 136 or PM data 126. In an embodiment, noise rise data is only normalized by the number of active users at S512. In some embodiments, user position and data use may be determined as well and included in subsequent normalization.

A number of active users for neighboring cells may be determined at S504 in order to account for radio frequency energy both from within the cell of interest and from users in nearby cells. The neighboring cells may include co-sited cells in addition to cells within a predetermined distance of the cell whose noise rise data is being normalized. In an embodiment, S504 includes determining a weighted sum of the total number of users in a region encompassing multiple nearby cells.

The neighbor cell data may be weighted at S510 in a number of ways. For example, neighbor cells may be weighted based on distances to the target cell, which may be expressed in raw values such as kilometers. Another embodiment may use relational or other representations such as neighbor tiers (e.g. local cell weighted at unity, first tier cells weighted at 0.7, second tier cells weighted at 0.5, etc.). These approaches may be based on propagation modeling predictions, distance, etc. and may account for a total number of active system users within a reasonable distance from the target cell.

Another factor that may be used to normalize noise rise is capacity credits, which are explained, for example, in 3GPP's Technical Specification TS 25.433. Capacity credits are used in some radio technologies (e.g. 3G HSPA) to track the percentage of total system resources allocated to carrying traffic. Using capacity credits to normalize noise rise effectively accounts for total data throughput as a function of total cell capacity as a way to predict expected noise rise. Therefore, a percentage of capacity credits may be determined at S506.

In an embodiment, the current capacity credit loading as well as total system capacity credits is reported as part of the network event data 136. Different wireless technologies utilize different methods of tracking percentage utilization, but one example includes capacity credits consumed as a percentage of total capacity credits as a way to predict total expected radio frequency energy within the channel. In addition to capacity credit data for the target cell, capacity credit data for neighbor cells may be determined at S506 as well, and the neighbor cell capacity credit data may be weighted based on proximity to the cell of interest at S510.

A number of active links for the target cell may be determined at S508. The active links may be sorted by a specific type of link or data, which may be included in the network event data 136. In an embodiment, a total number of one or more type of data link that are active at the target cell are summed to use as a normalizing denominator. In addition, the number of active links may be determined for neighbor cells as well as the target cell, and the link data may be weighted by link type as well as neighbor cell proximity at S510.

Weighting values are determined at S510. As explained above, data may be weighted according to its expected impact on the noise rise of the target cell, e.g. a co-sited and overlapping neighbor would have a higher weighting than a second tier neighbor cell. Finally, data is normalized at S512.

The elements of process 500 described above are non-exclusive and may be combined to create sophisticated noise rise normalization coefficients. Additional normalization metrics may be utilized based on specific technology, such as normalization by the number of Physical Resource Blocks (PRBs) allocated in an LTE system, or normalization by percentage of code tree utilized in a UMTS-based system.

In an embodiment, the normalization metrics may be uplink related, e.g. when the noise that is being measured is primarily uplink noise. However, in some embodiments, normalization may be performed against downlink metrics to aid in the detection of specific sources of noise rise, such as broadband noise. For instance, local system malfunctions, including transmitter intermodulation products, may result in high levels of broadband local noise that correlates with the amount of downlink traffic, even though the noise rise is detected in the uplink. In embodiments, detected noise rise may be normalized by several different metrics, and correlations may be performed against these metrics.

The following explanation is provided to help illustrate how embodiments of the present disclosure detect and characterize certain types of interference, especially broadband interference and PIM interference.

A multi-channel base station site which has multiple frequency channels in use (typically to build capacity via frequency layering), which could be multiple 3G, multiple 4G or even 3G, 4G and 2G services, has a number of transmitters transmitting relatively high power on downlink channels. If these transmit signals mix together through a non-linear device, they create sum and difference mixing products and harmonics of the transmitted signals. If any of these mixing products or harmonics happen to coincide with one or more of the uplink receive channel frequencies at use at the site, relatively high power mixing products can be received by sensitive nearby receivers. In this case, the downlink transmitters are creating interference to one or more sensitive uplink receivers located at the same cell site.

Such interference can be caused by faulty amplifiers or other active devices, but the most common causes are via passive devices including oxidized coaxial cable connectors and oxidized grounding straps tying equipment together. Metal oxides form a semiconductor junction and turn a simple metal to metal connection into an implicit semiconductor diode. Diodes are very non-linear devices and they make great mixers (most radio transmitters and receivers use diode mixers internally to shift frequencies around when necessary). So an oxidized metal to metal connection in the presence of strong transmitted RF energy can lead to PIM that can be problematic when the mixed transmit frequencies coincide with one of the receive channels in use at the same site.

When PIM does coincide with a receive channel, the resulting interference seen by that receiver will be strongly correlated to the traffic being carried by the downlink transmitters that are mixing together to cause the problem. Therefore, an embodiment may make one or more of the following determinations:

Is a relatively high level of uplink interference present in a receive channel?
Can the downlink channels in use at a cell mix together to coincide with the interfered receive channel?
Do co-site receivers using that same channel at the same cell site see time correlated interference?
Do distant neighbor cells fail to detect strongly time correlated interference events?
Is the detected interference strongly time correlated to downlink traffic from co-site transmitters that could mix to cause problems?
When the answer to all or some portion of these determinations is positive, then and embodiment of the present application may determine that PIM is present at the cell site.

Figure 6:
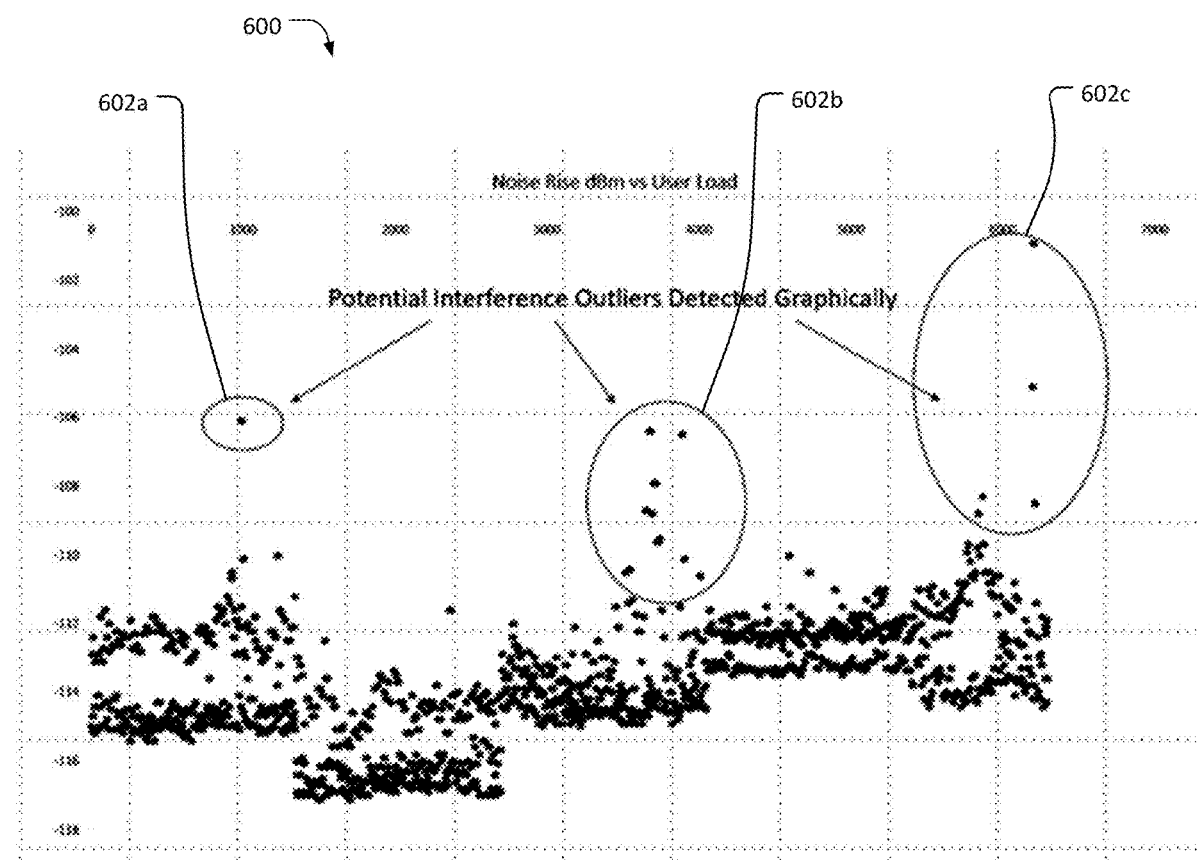
FIG. 6 illustrates noise rise for a plurality of cells in a network.

FIG. 6 illustrates a graphical representation 600 of noise rise data for a plurality of cells that has been normalized according to user load. The graphical representation may represent an output from process 500, as well as a mechanism for identifying outlier cells. For example, analysis of a graphical output could be used in addition or as an alternative to automatic processes performed at S302 and S304. Cells that are identified by graphical analysis may be further analyzed as described above with respect to processes 300, 400 and 500.

As seen in FIG. 6, when represented graphically, cells with high levels of noise rise normalized to traffic levels are readily apparent relative to cells that are performing within a normal, or expected, range. The outlier cells are in groups 602a, 602b and 602c. These outlier cells represent cell-level noise measurements inconsistent with user activity at the time of the measurement. Embodiments may identify statistical outliers of bulk cell data as represented in FIG. 6 to identify cells that are impacted from interference, or to identify cells for which to perform additional testing and investigation to determine whether interference is present. Various embodiments may use statistical approaches to identifying problematic cells as shown in FIG. 6 and predetermined threshold values.

Figure 7:
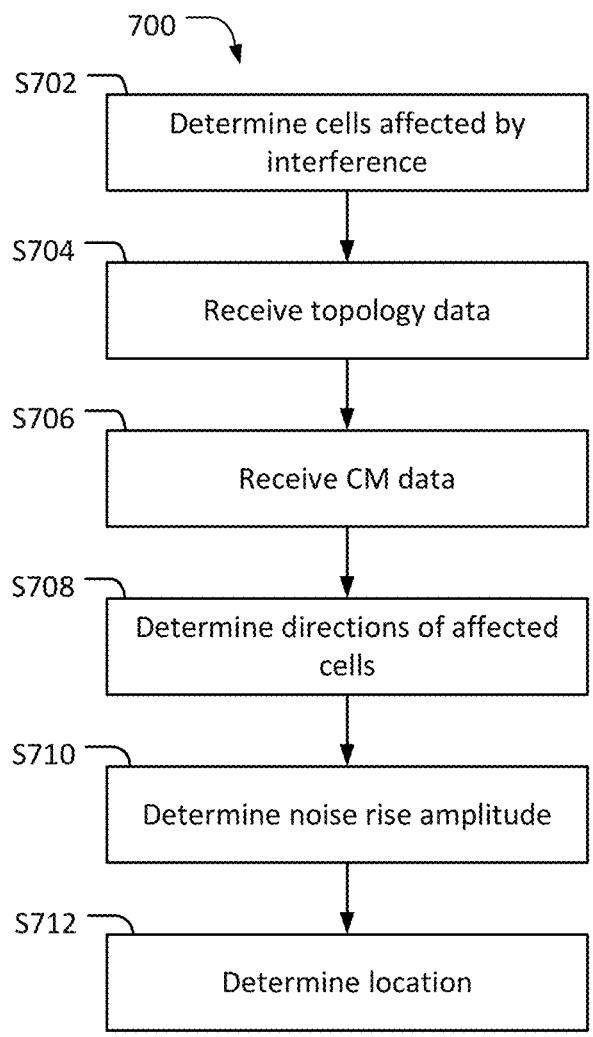
FIG. 7 illustrates an embodiment of a process localizing an interference source.

FIG. 7 shows an embodiment of a process 700 for localizing an interference source. A plurality of cells that are affected by interference are determined at S702. These may be high noise rise cells identified at S302 within a predetermined area. In an embodiment, the plurality of cells includes a high noise rise target cell, in addition to neighbor cells identified at S312. Co-sited cells correlated with the high noise rise target cell at S310 may be included in S702 as well.

Network topology data is received at S704. The network topology data may include geographical coordinates of the cells that are affected by interference, which may be expressed as latitude and longitude coordinates for each cell. Additional topology data may include elevation data for the cells, and data related to the surrounding network environment that could affect RF propagation, such as locations of commercial structures, bodies of water, etc.

Configuration Management (CM) data is received at S706. The CM data may include, for example, frequencies used by the cells, pointing directions, azimuth, elevation, half-power beamwidth, transmission power, etc. The CM data may be received in response to a request specifically transmitted for process 700, or may be stored by a spectrum analysis server 140 for use in multiple processes.

Figure 8:
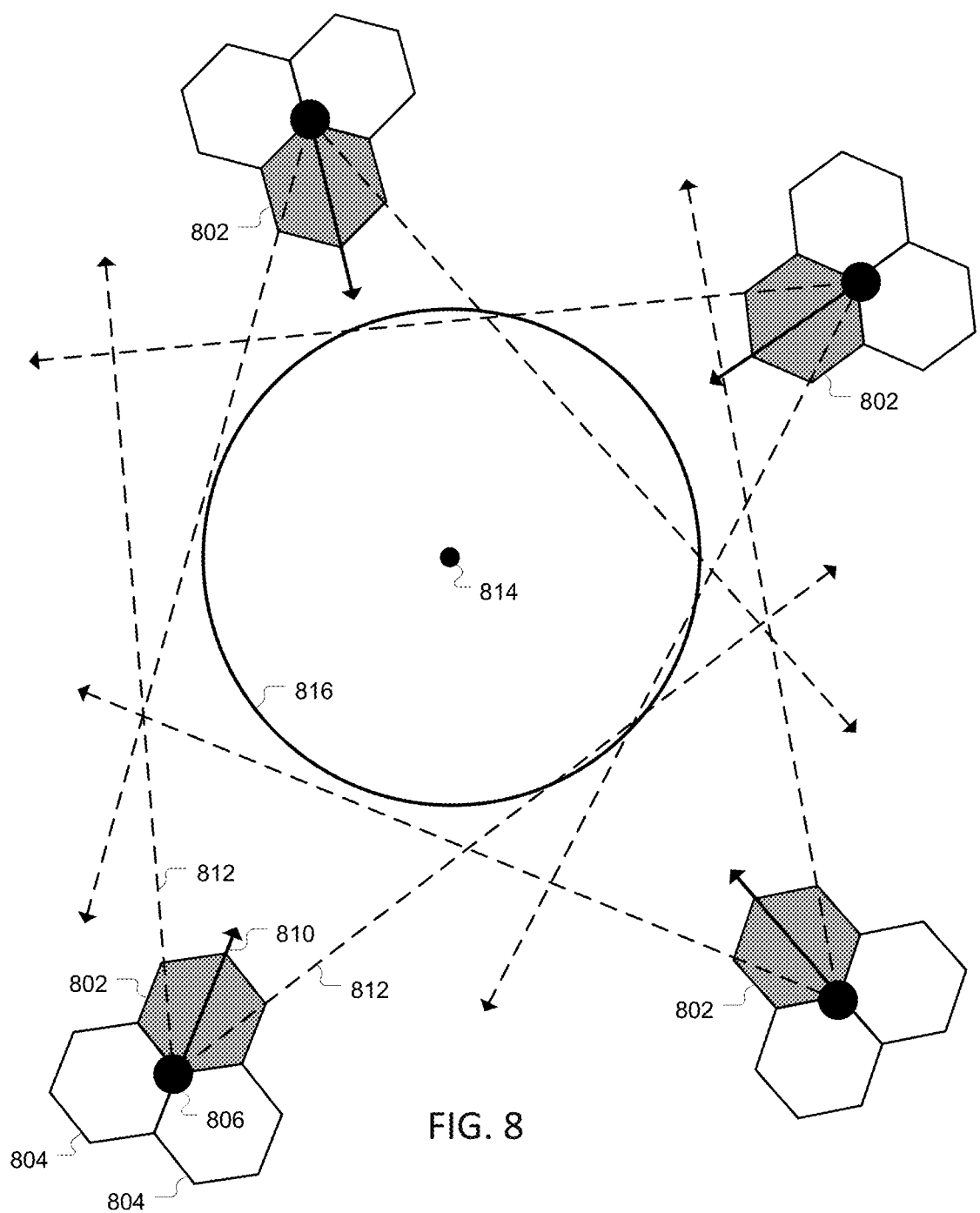
FIG. 8 illustrates an embodiment of a plurality of cells that are affected by interference.

FIG. 8 shows a plurality of cells 802 that are affected by interference. One of the cells 802 may be a target cell, while the other cells are neighbor cells that are correlated with the target cell at S312. Co-site cells 804 of a cell site 806 are shown in FIG. 8 as well, but for the purposes of this example they are not affected by interference.

The direction 810 of cells 802 that are affected by interference are determined at S708. While FIG. 8 shows direction 810 as being the pointing direction of antennas, or azimuth, embodiments may determine additional direction information at S708. For example, half-power beamwidth may be determined in order to establish antenna transmission areas 812, which may vary between cells according to transmission power.

Noise rise amplitude of affected cells is determined at S710, which may be normalized. In an embodiment, noise rise amplitude may be extracted from network event recordings. The noise rise amplitude can be used as a proxy for distance from the cells to localize an interference source.

The location of a source of interference is determined at S714 using one or more of the data collected for process 700. In an embodiment, a location is a point 814 that is determined to have the highest probability of being the source of the interference based on analyzing the cell data in process 700. However, the location data may be presented in many different ways.

For example, in one embodiment, the location data is an area 816. The area 816 may be determined from a statistical process, such as a probability value, where data analysis suggests that there is, for example, a 90% probability that a source of interference is within the area. In other embodiments, the location data may be expressed as an asymmetric heat map, a plurality of concentric circles or other shapes representing a distribution of probabilities, etc.

The accuracy of noise source localization depends on the number of and location of correlated high noise rise neighbor cells, as well as the amount of available data for the cells, such as pointing direction and half-power beamwidth. Persons of skill in the art will recognize that a number of different approaches can be taken to calculate location using cell data, such as triangulation, trilateration, etc. Examples of some of the techniques that could be employed can be found in, for example, U.S. application Ser. No. 14/827,226.

Embodiments of the present disclosure represent a number of improvements to existing wireless communication technology. Initial data analysis suggests that from 5% to 10% of existing cells are under-performing as a result of unintentional interference. The sources of such interference vary greatly, and include poorly insulated transformers, corroded connections, and unregulated transmitters. Conventionally, no single technique is capable of identifying these disparate sources.

Embodiments of this disclosure provide such a solution. The system and processes described here can be used to identify interference indirectly through its effect on cellular performance, and can characterize the effects sufficiently to identify, for example, whether the interference is local to a single base station by correlating co-sited cells, or external to a base station by correlating with neighbor cells. Elements of the interference may be characterized through its effects, and this information may be provided to an operator, which can use it to deploy personnel to remedy the physical interference cause, such as replacing an oxidized connector or notifying a power company of a malfunctioning component. An operator may be a licensor of RF spectrum that operates a cellular telecommunications network.

Network event data is conventionally used to troubleshoot performance issues that are specific to certain models of wireless devices. Network event data is not conventionally used for interference detection or characterization. By using network event data, embodiments of the present disclosure can detect interference rapidly as it appears in a network, and are capable of substantially higher resolution analysis than is possible with conventionally reported PM and KPI data, and can analyze interference variation in the time domain. Furthermore, embodiments of the present disclosure can identify and characterize interference without requiring network service interruptions, and without installing additional energy sensing equipment in network areas.

What is claimed is:

1. A method for determining whether one or more cells in a cellular network are affected by non-cellular interference in a cellular network, the method comprising:
   measuring RF energy received at a plurality of base station antennas in the cellular network;
   generating measurement data for a plurality of cells from the RF energy measurements, the measurement data including noise measurements and cell load data for each respective cell, the cell load data corresponding to the measurement data in the time domain;
   determining noise rise values for the respective cells using the measurement data;
   normalizing, for each cell of the plurality of cells, the noise rise values according to cell load of the respective cell;
   comparing the normalized noise rise values of the plurality of cells to identify at least one outlier cell; and
   reporting the at least one outlier cell as being affected by non-cellular interference.

2. The method of claim 1, further comprising:
   identifying, for a target cell, a set of cells that are co-sited with the target cell;
   identifying, for the target cell, a set of neighboring cells associated with different cell sites from the target cell, wherein comparing the normalized rise values includes comparing a normalized noise rise value for the target cell with normalized noise rise values for the set of co-sited cells and comparing the normalized noise rise value for the target cell with normalized noise rise values of the set of neighboring cells; and
   when the normalized noise rise value of the target cell correlates with the normalized noise rise values of the set of co-sited cells, and the normalized noise rise value of the target cell does not correlate with the normalized noise rise values of the neighbor cells, determining that the non-cellular interference is local to a base station of the target cell.

3. The method of claim 1, further comprising:
   identifying, for a target cell, a set of cells that are co-sited with the target cell;
   identifying, for the target cell, a set of neighboring cells, wherein comparing the normalized rise values includes comparing a normalized noise rise value for the target cell with normalized noise rise values for the set of co-sited cells and comparing the normalized noise rise value for the target cell with normalized noise rise values of the set of neighboring cells; and
   when the normalized noise rise value of the target cell does correlate with the normalized noise rise values of the set of co-sited cells, and the normalized noise rise value of the target cell correlates with the normalized noise rise values of the neighbor cells, determining that the non-cellular interference is external to a base station of the target cell.

4. The method of claim 1, further comprising:
   determining a location of the non-cellular interference using locations of neighbor cells whose normalized noise rise values correlate with the normalized noise rise of the target cell.

5. The method of claim 1, wherein the noise rise values are derived from call event data.

6. The method of claim 5, wherein the call event data includes power measurement data from user equipment (UE) being served by the plurality of cells.

7. The method of claim 1, wherein the noise rise values are determined from key performance indicators (KPI) in PM reports.

8. The method of claim 1, wherein the time correlation is determined at a resolution of one minute or less.

9. The method of claim 1, wherein the cell load data is based on at least one of a number of attached users and a number of active users.

10. A method for determining whether non-cellular interference is affecting a wireless cellular telecommunications network using a computer coupled to the network, the method comprising:

measuring RF energy received at a plurality of base station antennas in the cellular network;

generating performance measurement (PM) data for a plurality of cells from the RF energy measurements;

receiving, by the computer, the PM data for the plurality of cells in the network, the PM data including noise measurements and cell load data for each respective cell, wherein a time period of the cell load data overlaps with a time period of the noise measurements;

normalizing noise rise values that are associated with the PM data for the plurality of cells according to the cell load data associated with the respective cells for the time period;

comparing the normalized noise rise values of the plurality of cells to identify at least one outlier cell; and determining that non-cellular interference is affecting the outlier cell.

11. A cellular network system comprising:

a plurality of base stations, each of the base stations comprising one or more antenna configured to receive RF energy; and at least one non-transitory computer readable medium which, when executed by a processor, performs the following operations:

generating measurement data for a plurality of cells in the network based on the RF energy received by the plurality of base stations, the measurement data including noise measurements and cell load data for each respective cell, the cell load data corresponding to the measurement data in the time domain;

determining noise rise values for the respective cells using the measurement data;

normalizing, for each cell of the plurality of cells, the noise rise values according to cell load of the respective cell;

comparing the normalized noise rise values of the plurality of cells to identify at least one outlier cell; and reporting the at least one outlier cell as being affected by non-cellular interference.

12. The system of claim 11, wherein the operations further comprise:

identifying one or more cell that is co-sited with the target cell, wherein normalizing the noise rise values of the plurality of cells includes correlating the normalized noise rise value of a target cell with the normalized noise rise values of one or more cell that is co-sited with the target cell.

13. The system of claim 12, wherein the operations further comprise:

identifying, for the target cell, a set of neighboring cells associated with different cell sites from the target cell, wherein correlating the normalized noise rise value of the target cell further includes correlating the normalized noise rise value of the target cell with normalized noise rise values of the set of neighbor cells.

14. The system of claim 13, wherein the operations further comprise:

when the normalized noise rise value of the target cell correlates with the normalized noise rise value of the one or more cell that is co-sited with the target cell, and the normalized noise rise value of the target cell does not correlate with the normalized noise rise values of the set of neighbor cells, determining that the non-cellular interference is local to a base station of the target cell.

15. The system of claim 13, wherein the operations further comprise:

when the normalized noise rise value of the target cell does correlate with the normalized noise rise value of the one or more cell that is co-sited with the target cell, and the normalized noise rise value of the target cell correlates with the normalized noise rise values of the set of neighbor cells, determining that the non-cellular interference is external to a base station of the target cell.

16. The system of claim 15, wherein the operations further comprise:

determining a location of the unintentional interference using locations of the neighbor cells that correlate with the normalized noise rise of the target cell.

17. The system of claim 11, wherein noise rise values are derived from call event data.

18. The system of claim 17, wherein the call event data includes power measurement data from user equipment (UE) being served by the plurality of cells.

19. The system of claim 11, wherein the cell load data includes at least one of a number of attached users and a number of active users.

20. The system of claim 11, wherein the at least one processor is disposed in a spectrum analysis server incorporated into an operations support system (OSS) of a cellular network operator.

* * * * *